Aug. 18, 1970   E. NATKINS   3,524,619
CORE FINS FOR INJECTION-BLOW MOLDING
Filed June 28, 1968

INVENTOR.
EPHRAIM NATKINS
BY
Brumbaugh, Graves, Donohue & Raymond
his ATTORNEYS

United States Patent Office 3,524,619
Patented Aug. 18, 1970

3,524,619
CORE PINS FOR INJECTION-BLOW MOLDING
Ephraim Natkins, Jackson Heights, N.Y., assignor to APL Corporation, Brooklyn, N.Y., a corporation of New York
Filed June 28, 1968, Ser. No. 741,010
Int. Cl. B28b 7/16
U.S. Cl. 249—142                                          2 Claims

ABSTRACT OF THE DISCLOSURE

Molding apparatus in which two separable mold sections close about a core pin and define with the core pin a mold cavity provided with a pair of O-rings longitudinally spaced apart on the core pin in spaced-apart relation to the mold cavity. The O-rings reduce shock to and abrasion of the core pin during the seating of the core pin within the mold sections, facilitate limited lateral movement of the core pin without making contact with the mold sections, and reduce the venting rate and hence the flashing of plastic from the mold cavity.

BACKGROUND OF THE INVENTION

This invention relates to molding and, more particularly, to novel and highly-effective injection-blow molding apparatus adapted to produce molded articles of superior quality and to have a significantly longer useful life than conventional apparatus.

Conventional injection-blow molding apparatus includes separable mold sections opposable to each other and a core pin enclosable between the mold sections and defining with the mold sections an injection mold cavity. Means is provided for injecting mold substance into the injection mold cavity to form a parison, and the parison is subsequently expanded in an expansion mold cavity to form a completed article, for example, a bottle.

Conventional apparatus is characterized by a number of deficiencies. For example, the air typically vents from the injection mold cavity at an excessive rate as mold substance is injected into the injection mold cavity. As the mold substance fills the mold cavity, it flashes therefrom between the mold sections and the core pin, thereby producing a completed article of inferior quality. Further, both the injection and blow mold sections, in closing about the core pin, may strike the core pin if the latter is not perfectly centered, thereby causing shock to and abrasion of the core pin or mold sections and shortening the useful life of the apparatus. Moreover, the injected mold substance may move the free end of the core pin laterally, when it is enclosed within the injection mold sections, so that the core pin engages the injection mold sections during the injection of mold substance, thereby causing further wear of the apparatus.

SUMMARY OF THE INVENTION

An object of the invention is to remedy the deficiencies of the prior art outlined above. In particular, an object of the invention is to provide molding apparatus including an injection mold cavity from which the rate of venting of air during the injection of mold substance is slowed to the point that flashing of mold substance from the injection mold cavity is minimized. A further object of the invention is to provide molding apparatus including injection mold sections and blow mold sections adapted to be closed rapidly and forcefully about a core pin without causing shock to or abrasion of the core pin or mold sections. Another object of the invention is to provide molding apparatus in which the core pin is adapted to move laterally a limited distance without engaging the mold sections.

The foregoing and other objects of the invention are attained, in a representative embodiment thereof, by the provision of separable mold sections opposable to each other, a core pin enclosable between the mold sections and defining with the mold sections a mold cavity, and O-ring sealing means mounted between the mold sections and the core pin in spaced-apart relation to the mold cavity.

BRIEF DESCRIPTION OF THE DRAWING

An understanding of additional aspects of the invention may be gained from a consideration of the following detailed description of a representative embodiment thereof, taken in conjunction with the accompanying figures in the drawing, in which.

DESCRIPTION OF THE PREFERRED EMBODIMENT

Figure 1:
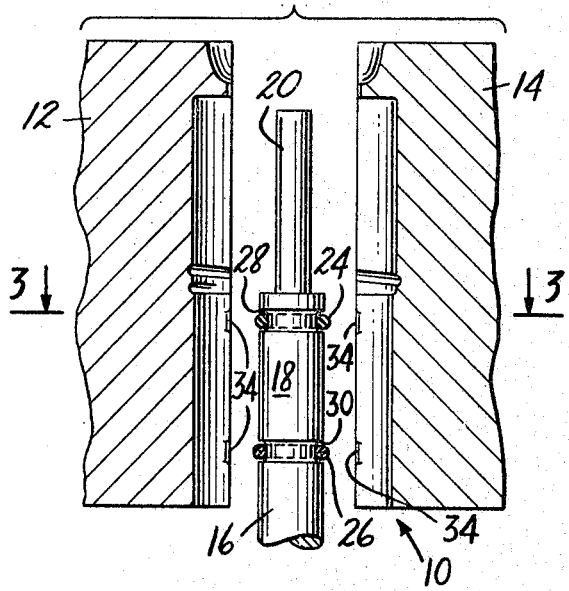
FIG. 1 is a longitudinal view, partly in section, of a representative embodiment of apparatus according to the invention, the apparatus being shown in the open position.
Figure 2:
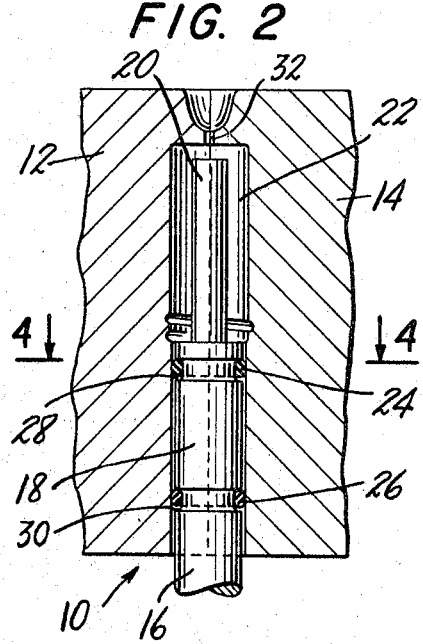
FIG. 2 is a view corresponding to FIG. 1 but showing the apparatus in a closed position.
Figure 3:
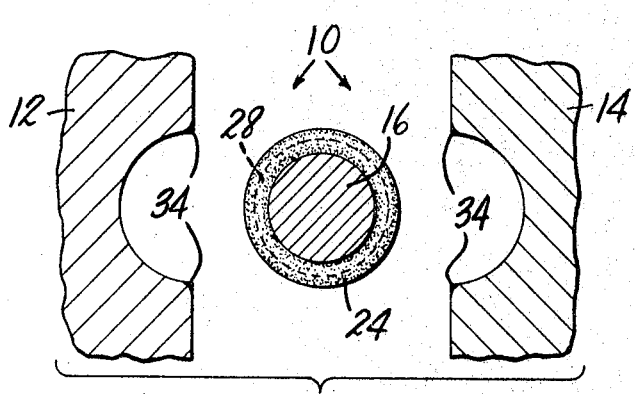
FIG. 3 is a view taken along the line 3—3 of FIG. 1 and looking in the direction of the arrows.
Figure 4:
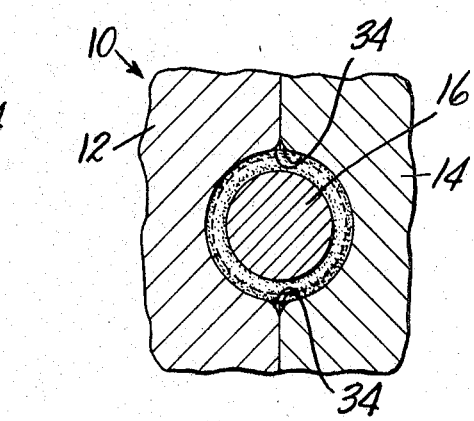
FIG. 4 is a view taken along the line 4—4 of FIG. 2 and looking in the direction of the arrows.
Figure 5:
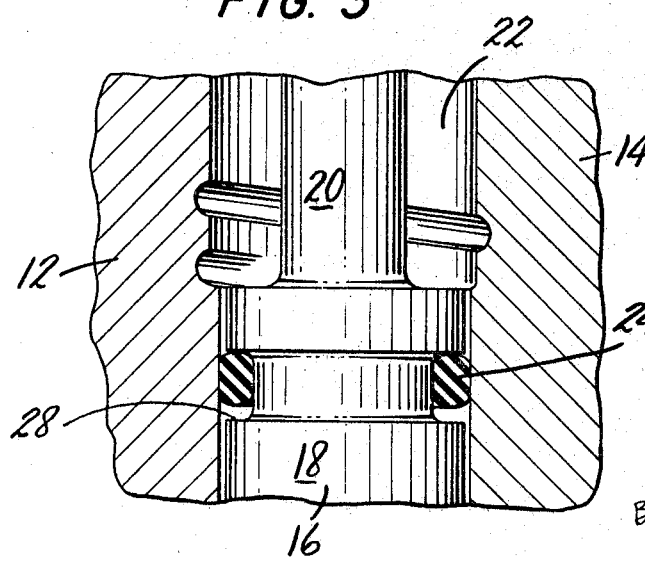
FIG. 5 is a fragmentary view of a portion of the apparatus as shown in FIG. 2 but on a larger scale in order better to show the structural details.

Apparatus 10 constructed in accordance with the invention includes partible mold sections 12 and 14 relatively movable between an open condition, as shown in FIGS. 1 and 3, and a closed condition, as shown in FIGS. 2, 4, and 5. A core pin 16, having a base portion 18 and a tip portion 20, is enclosable between the mold sections 12 and 14 and defines with the mold sections 12 and 14 an injection mold cavity 22 when the mold is closed.

In accordance with the invention, O-ring sealing means including a pair of O-rings 24 and 26 is mounted between the mold sections 12 and 14 on the one hand and the core pin 16 on the other in spaced-apart relation to the mold cavity 22. More particularly, the O-rings 24 and 26 are mounted in grooves 28 and 30, respectively, on the portion 18 of the core pin 16. The grooves 28 and 30 are shown as formed entirely in the core pin 16, but, in another embodiment of the invention, they are formed partly or wholly in the mold sections 12 and 14.

The O-rings 24 and 26 are longitudinally spaced apart on the core pin 16, thereby affording good support for the core pin 16. As a comparison of FIGS. 1 and 2 or 5 reveals, the O-rings 24 and 26 are subjected to a lateral compressive force upon the closing of the mold sections 12 and 14, thereby providing a virtual seal between the portion 18 of the core pin 16 and the mold sections 12 and 14. As a result, the rate of venting of air from the mold cavity 22 between the portion 18 of the core pin 16 and the mold sections 12 and 14 is minimized as mold substance is injected through a mold gate 32 into the mold cavity 22. Accordingly, there is little or no flashing of mold substance from the mold cavity 22 between the portion 18 of the core pin 16 and the mold sections 12 and 14. The reduction or elimination of flashing of mold substance produces a superior article as compared to the article typically produced by conventional apparatus.

Moreover, the O-rings 24 and 26 facilitate limited lateral movement of the core pin 16 while the core pin 16 is enclosed within the mold sections 12 and 14. At the same time, the O-rings 24 and 26 maintain the core pin in spaced-apart relation to the mold sections 12 and 14, thereby preventing abrasion of the core pin 16 and mold sections 12 and 14 and contributing to a long useful life of the apparatus.

As FIGS. 3 and 4 show, the mold sections 12 and 14 are rounded off at the point 34 adjacent to the O-ring seal 24 where the mold sections 12 and 14 engage each other on closing. The mold sections 12 and 14 are similarly rounded off at the point adjacent to the O-ring 26 where the mold sections 12 and 14 engage each other on closing. In this way, the O-ring sealing means is not damaged by the closing of the mold sections.

The O-ring seals 24 and 26 on the core pin 16 cooperate with partible blow mold sections (not shown) in a way analogous to the way in which they cooperate with the injection mold sections 12 and 14. Specifically, they are in spaced-apart relation to the blow mold cavity, permit limited lateral movement of the core pin 16, and prevent shock to and abrasion of both the core pin and the blow mold sections. In both the injection and blow stages of an injection-blow molding process, therefore the advantages of the invention are realized.

Thus, there is provided in accordance with the invention novel and highly-affective molding apparatus adapted to give long useful life and to produce superior articles. Many modifications of the representative embodiment of the invention disclosed herein will readily occur to those skilled in the art. Accordingly, the invention is to be construed as including all of the modifications thereof within the scope of the appended claims.

I claim:

1. Molding apparatus comprising separable mold sections opposable to each other, a core pin enclosable between said mold sections and defining with said mold sections a mold cavity, O-ring sealing means mounted between said mold sections and said core pin in spaced-apart relation to said cavity, said O-ring sealing means protecting said core pin against shock and abrasion during closing of said mold sections around said core pin, and groove means formed in at least one of said mold sections and core pin to facilitate mounting of said O-ring sealing means.

2. Molding apparatus comprising separable mold sections opposable to each other, a core pin enclosable between said mold sections and defining with said mold sections a mold cavity, O-ring sealing means mounted between said mold sections and said core pin in spaced-apart relation to said cavity, said O-ring sealing means protecting said core pin against shock and abrasion during closing of said mold sections around said core pin, and said mold sections being rounded off at the point adjacent to said O-ring sealing means where they engage each other on closing so that said O-ring sealing means is not damaged by the closing of said mold sections.

References Cited
UNITED STATES PATENTS

| | | |
|---|---|---|
| 2,304,461 | 12/1942 | Knowles. |
| 2,604,661 | 7/1952 | Karns. |
| 3,172,929 | 3/1965 | Santelli _____ 18—5 X |
| 3,202,749 | 8/1965 | White _____ 18—42 X |
| 3,366,995 | 2/1968 | Dijken et al. |
| 3,371,387 | 3/1968 | Cleereman et al. _____ 18—42 |
| 2,913,762 | 11/1959 | Knowles _____ 18—5 |
| 3,116,877 | 1/1964 | Moslo _____ 18—5 |

J. HOWARD FLINT, JR., Primary Examiner

U.S. Cl. X.R.

2.49—63; 18—5, 42